Pennie & Chinnock,
Nose Bag.
No. 47,498. Patented Apr. 25, 1865.
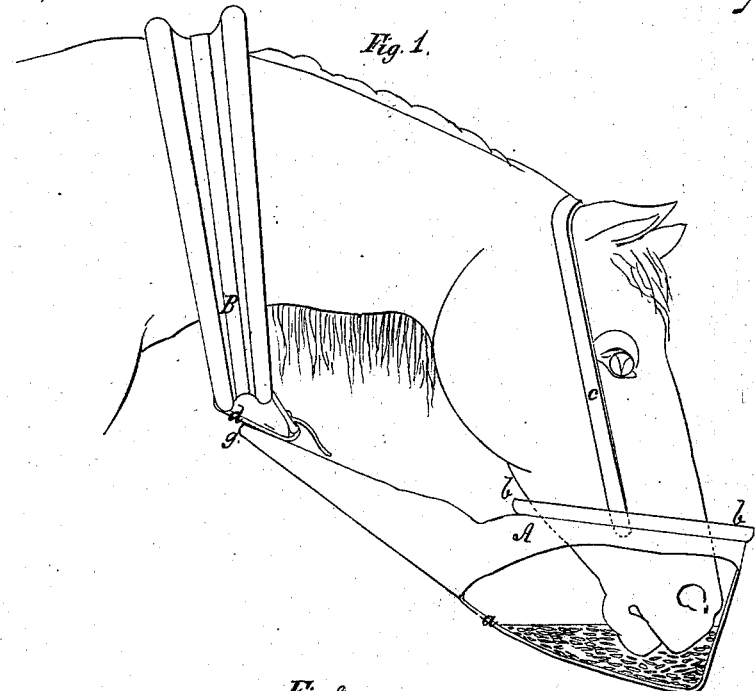
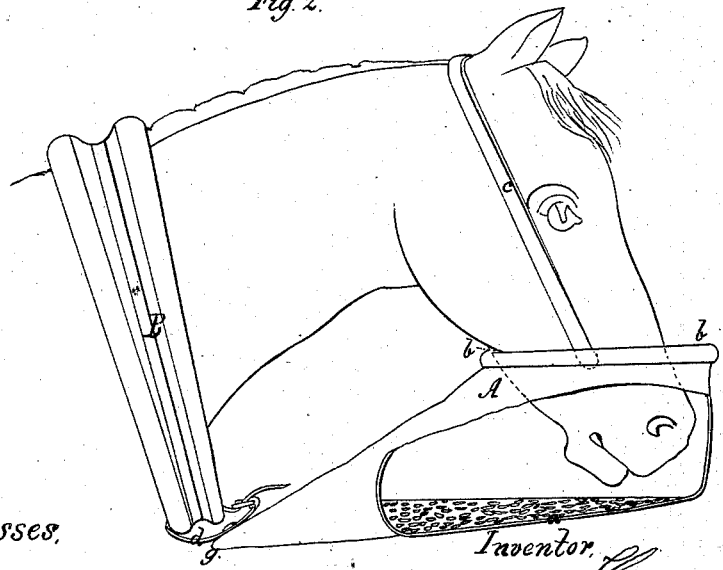

UNITED STATES PATENT OFFICE.

HENRY PENNIE AND CHARLES CHINNOCK, OF NEW YORK, N. Y., ASSIGNORS TO THEMSELVES AND LEVI BISSELL, OF SAME PLACE, AND REASSIGNED BY LEVI BISSELL TO SAID PENNIE AND CHINNOCK.

IMPROVEMENT IN FEED-BAGS.

Specification forming part of Letters Patent No. 47,198, dated April 25, 1865.

*To all whom it may concern:*

Be it known that we, HENRY PENNIE and CHARLES CHINNOCK, both of the city, county, and State of New York, have invented a new and useful Improvement in Feed-bags or Portable Cribs for Horses and other Animals; and we do hereby declare that the following is a full, clear, and exact description of the same, reference being had to the accompanying drawings, forming part of this specification, in which—

Figures 1 and 2 are side views representing the application of our bag or crib to a horse, and illustrating two different positions.

A portion of the side of the bag is represented as torn away in each of these figures to show the position of the feed.

Similar letters of reference indicate corresponding parts in the several figures.

The object of our invention is threefold—viz., first, to enable the horse or other animal to breathe freely while feeding from a bag or crib suspended from his head; second, to obviate the necessity of any support below such bag or crib, and, third, to prevent any waste of feed by leaving any in the bag or crib or by throwing it out in feeding.

It consists in so constructing the bag or crib that by suspending it from the head of the horse or other animal, and attaching it to the collar or otherwise, at a point or points in front of and near the breast, the bottom will be caused to incline downward from the breast toward the mouth when the animal's head is lowered to a certain position, and to incline downward from the mouth toward the breast when his head is raised to a certain position, thereby enabling the animal to bring the feed to his mouth when he wants to do so, and to bring it out of the way and so allow himself to breathe freely while chewing.

The form of the bag or crib may be somewhat varied; but to enable others to make and use our invention we will proceed to describe it with reference to the drawings, which represent it in the form which we consider best adapted to the ends in view.

A is the bag or crib, made of a form somewhat resembling a shoe, the bottom $a$ being elongated from the rear of the mouth $b$, something like the fore part of a shoe.

The bag or crib may be made of canvas or other material. Its bottom may be flexible or stiffened by a board or other means. The mouth $b$ is stiffened and kept open by means of a frame of iron or other suitable material of square or other form, and is large enough to leave a good space all around the head of the animal when the bag or crib is suspended by means of a strap, $c$, which is attached to the opposite sides of its mouth, and which passes over the head of the animal just behind the ears, the length of such strap being such that the animal's mouth may reach the bottom of the bag when his lips are extended. The elongated toe-like extremity $g$ of the bottom of the bag or crib has attached to it one or more straps or other fastenings, $d$, by which to attach it to the lower part of the collar B, or to any other part or parts of the harness, or in any other manner to or near the breast of the animal. When the bag or crib is thus suspended from the head or attached to the breast, the depression of the head of the animal, as shown in Fig. 1, causes the bottom of the bag or crib to have a downward inclination toward his mouth, so that the feed will run down within his reach, but the elevation of his head, as shown in Fig. 2, will cause the bottom of the bag or crib to incline in the opposite direction, and the feed to run down toward the toe-like extremity $z$ of the bottom, so that while chewing the animal may breathe freely. A horse will find no difficulty in feeding from this bag or crib the first time, as when he wants to get a mouthful he will naturally lower his head to reach the feed, and if his breathing is hindered by the feed being around his nostrils, he will naturally raise his head. Every particle of feed can be eaten and none of it shaken out; for as soon as the horse raises his head the whole of the feed runs down toward the toe-like portion of the bottom.

If made water-proof, the bag may be used as a water-bucket.

The connection with the collar or at the breast may be made elastic or yielding to prevent its being broken by any sudden movement of the head of a fractious animal.

What we claim as our invention and desire to secure by Letters Patent, is—

A feed bag or portable crib for a horse or other animal, so constructed that it may be at the same time suspended from the head and attached to or near the breast of the animal, and when so suspended and attached may have its bottom inclined downward toward or from the animal's mouth by the downward and upward movements of his head, substantially as and for the purpose herein described.

HENRY PENNIE.
CHAS. CHINNOCK.

Witnesses:
HENRY T. BROWN,
J. W. COOMBS.